United States Patent [19]

Curbelo et al.

[11] Patent Number: 4,828,367
[45] Date of Patent: May 9, 1989

[54] INTERFEROMETER BEARING ASSEMBLY

[75] Inventors: Raul Curbelo, Lexington; David C. Brown, Cambridge, both of Mass.

[73] Assignee: Bio-Rad Laboratories, Inc., Hercules, Calif.

[21] Appl. No.: 156,258

[22] Filed: Feb. 16, 1988

[51] Int. Cl.$^4$ .............................................. G02B 7/18
[52] U.S. Cl. .................................... 356/345; 350/632; 350/637; 384/42
[58] Field of Search ................ 356/345; 350/631, 632, 350/633, 637, 639, 321; 372/107; 384/42

[56] References Cited

U.S. PATENT DOCUMENTS 4,710,001 12/1987 Lacey ................................... 350/632

Primary Examiner—Vincent P. McGraw
Assistant Examiner—S. A. Turner
Attorney, Agent, or Firm—Townsend and Townsend

[57] ABSTRACT

An interferometer bearing assembly including a fixed glass rail, a movable carriage that carries both the movable interferometer mirror and the drive coil for the linear motor, and a mechanism for biasing the carriage onto the rail. The glass rail has two optically flat faces defining a normally horizontal line of intersection. The carriage is a rigid structure with plastic surface portions that provide a bearing interface for contacting the flat faces of the glass rail. To improve stability and reduce the possibility of any transverse movement, the carriage is downward biased, preferably by providing an overlying glass plate with a downwardly-facing flat surface, and mounting a spring-loaded plastic element to the top of the carriage. The plastic element contacts (and slides along) the flat glass surface and transmits a downward force to the carriage.

18 Claims, 1 Drawing Sheet

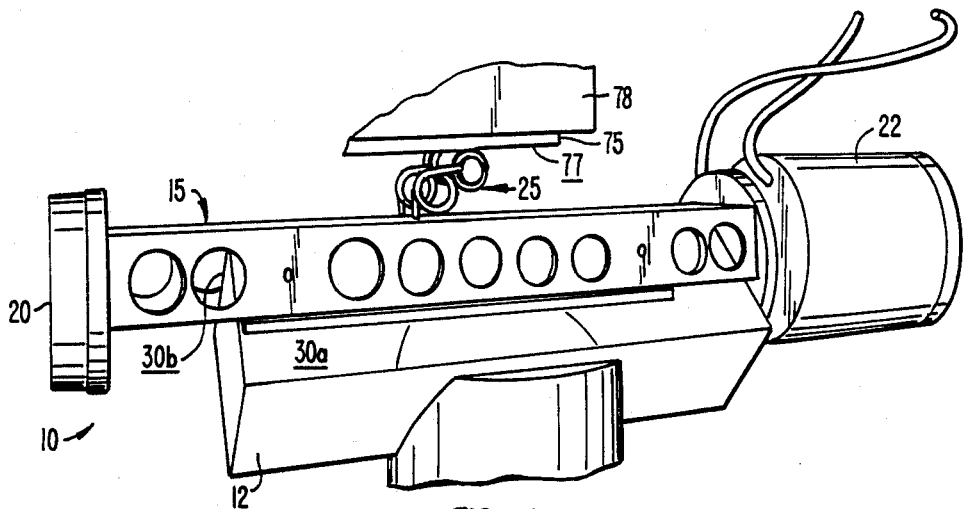
FIG._1.
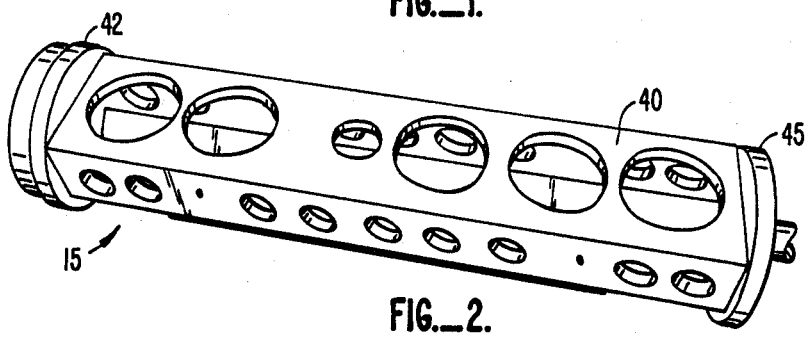
FIG._2.
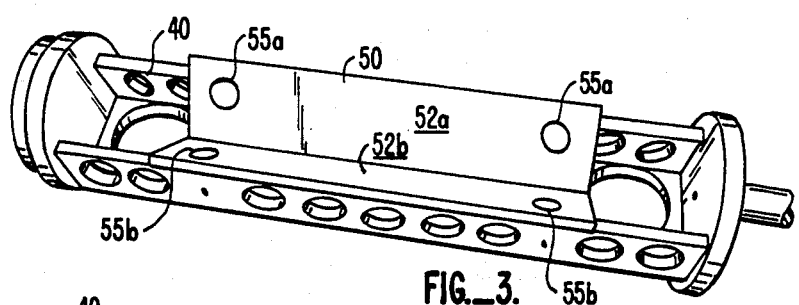
FIG._3.
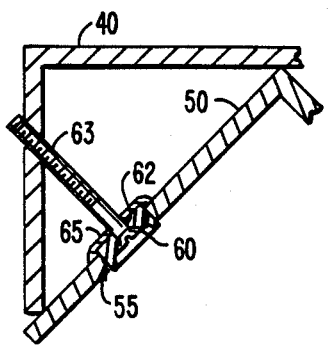
FIG._4.
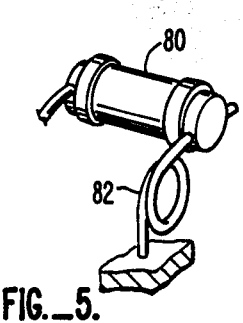
FIG._5.

INTERFEROMETER BEARING ASSEMBLY

FIELD OF THE INVENTION

The invention relates generally to interferometers, and more specifically to a bearing assembly for a rapid-scan interferometer.

BACKGROUND OF THE INVENTION

In a rapid-scan Michelson interferometer, a mirror (or other reflector) is repeatedly swept over a scan range at relatively high speed (for example, a few seconds for a 1 -cm scan). The driving force is provided by a linear electric motor or similar drive source. The movement must be extremely straight and uniform. Commercially available rapid-scan interferometers typically use an air bearing comprising a piston and cylinder with provision for an air film in order to ensure low friction. While such an arrangement has proved extremely satisfactory, it has the disadvantage that a source of dry gas must be maintained for the bearing. This represents a cost, in terms of monetary expense and inconvenience.

SUMMARY OF THE INVENTION

The present invention provides a simple, inexpensive interferometer bearing assembly characterized by extreme linearity of motion.

In brief terms, the interferometer bearing assembly includes a fixed rail and a movable carriage that carries the movable interferometer mirror and couples to the drive source. In a preferred embodiment the bearing assembly further includes a mechanism for biasing the carriage onto the rail.

The rail has two non-parallel optically flat faces defining a normally horizontal line of intersection. The rail is preferably made f glass, which is easily polished to optical flatness. The carriage is a rigid structure with surface portions that provide a bearing interface for contacting the flat faces of the rail. The surface portions are preferably plastic characterized by low wear and low friction. The biasing is preferably implemented by providing an overlying glass plate with a normally downwardly-facing flat surface, and mounting a spring-loaded plastic element to the top of the carriage. The plastic element contacts (and slides along) the flat glass surface and transmits a downward force to the carriage.

The present invention has the advantage over air bearings in that the interferometer user is spared the necessity of providing and maintaining a source of dry gas for the bearing. Additionally, due to the positive mechanical registration of the carriage along a pair of non-parallel optical flat surfaces, the present invention tends to be less prone to any transverse (pitching or yawing) motions that would tend to upset the accuracy of the interferometric measurement. Moreover, the nature of the mechanical construction readily lends itself to long-stroke embodiments.

A further understanding of the nature and advantages of the present invention may be realized by reference to the remaining portions of the specification and the attached drawings.

BRIEF DESCRIPTION OF THE DRAWINGS

FIG. 1 is an overall perspective view of the interferometer bearing assembly of the present invention;

FIG. 2 is a top perspective view of the carriage;

FIG. 3 is a bottom perspective view of the carriage;

FIG. 4 is a detailed sectional view of the plastic bearing insert and its mounting, taken along line 4—4 of FIG. 1; and FIG. 5 is a detailed view of the biasing element.

DESCRIPTION OF THE PREFERRED EMBODIMENT

FIG. 1 is an overall perspective view of an interferometer bearing assembly 10 according to the present invention. While specific dimensions do not form a part of the present invention, approximate sizes and masses will be given below for an embodiment suitable for a stroke length on the order of 1.5 cm.

Bearing assembly 10 includes a fixed rail 12 and a movable elongate carriage 15 which is caused to reciprocate along the rail. The illustrative embodiment contemplates horizontal motion, but other configurations are possible. The carriage carries a plane mirror 20 on one end, which defines the movable mirror for the Michelson interferometer, and a drive coil 22 at the other end. Rail 12 is about 10 cm long and carriage 15 is about 12 cm long. As will be described in detail below, in addition to gravity, an auxiliary biasing mechanism, broadly denoted 25, is provided to help keep carriage 15 properly seated on rail 12.

Rail 12 is an elongate body of glass, having first and second non-parallel flat faces 30a and 30b. Flat faces 30a-b are optically ground and polished to about one-half wavelength flatness. The flat faces are characterized by a line of intersection, and the rail is mounted to the interferometer optical bench with the line of intersection horizontal. It should be understood that flat faces 30a-b do not actually intersect, but rather that the regions near the would-be intersection are truncated or provided with a radius to avoid sharp edges. In the illustrative embodiment, rail 12 is square in cross-section, but such is not necessary. Only two flat faces are necessary, and they need not be 90° to each other. A range of acute and obtuse angles would be suitable. The use of glass for the rail is preferred, but other materials capable of being ground smooth and flat can be used.

FIGS. 2 and 3 are top and bottom perspective views of carriage 15. Carriage 15 is formed from a U-section channel 40, a first endpiece 42 for mounting the mirror, a second endpiece 45 for mounting the drive coil for the linear motor, and a V-section channel 50 extending part way along U-section channel 40. U-section channel 40 is typically aluminum with a wall thickness on the order of 0.15–0.2 cm. The sides and top of U-section channel 40 are formed with numerous apertures to reduce the mass of the carriage.

V-section channel 50 has channel faces 52a-b that are angled to conform generally to the configuration of flat faces 30a-b on glass rail 12, but a precise match is unnecessary since the channel faces do not actually contact the rail surfaces. Rather, each of channel faces 52a-b is fitted with a pair of bearing inserts, the inserts being denoted 55a for the pair mounted to channel face 52a, 55b for the pair mounted to channel face 52b, and 55 collectively. It is these bearing inserts that actually contact the flat faces of glass rail 12. The presently preferred material for inserts 55 is ultra-high molecular weight polyethylene. However, other low friction, low wear materials can be used.

FIG. 4 is a detailed sectional view showing how plastic bearing inserts 55 are mounted to V-section channel 50. Each bearing insert is a cylindrical body of plastic, formed with a recess 60 and a central countersunk screw hole 62. The precision positioning of the bearing inserts is carried out as follows. For each insert a screw 63 is passed through screw hole 62 and into a tapped hole in the side of U-section channel 40. This permits an approximate and somewhat flexible positioning of the inserts. With the inserts so positioned, the carriage is placed on the rail for final positioning with inserts 55 seated on flat faces 30a–b. Once the carriage is seated on the rail with the inserts making precise intimate contact with the flat glass faces, the positions of the inserts are rendered permanent by potting the regions surrounding the inserts behind channel faces 52a–b with epoxy, generally denoted at 65.

The carriage mass is about 20 gm (about 80 grams with the mirror and drive coil). Since the drive coil is normally heavier than the mirror, the final moving assembly is typically unbalanced, Therefore, once the final positioning of the inserts has been achieved and the mirror and drive coil mounted, it may be necessary to add weights to equalize the loading on the bearing inserts.

The overall operation of the biasing mechanism can be seen with reference to FIGS. 1 and 5. Biasing mechanism 25 includes a fixed structure and a structure mounted to carriage 12. The fixed structure includes an overlying glass plate 75 having a smooth lower surface 77 and fixedly mounted to an overlying support 78 that is itself rigidly mounted to the optical bench, and is therefore rigidly mounted with respect to the rail.

FIG. 5 is a detailed view showing the portion biasing mechanism 25 that is carried by carriage 12. This portion of the biasing mechanism includes a plastic slider 80 that is urged upwardly (into contact with glass plate 75) by a pair of springs 82. Slider 80 is cylindrical in configuration and carries a pair of spaced annular ridges near its ends. Springs 82 are 1–2 turn torsion springs, each having one of its ends coupled to slider 80 near a respective end of the slider and the other of its ends coupled to the carriage. The biasing force actually exceeds the total moving weight, being the equivalent of about 100 gm.

The need for biasing mechanism 25 may be obviated by making the carriage massive enough that gravity alone suffices to hold it to the rail. However, an overly massive carriage places increased demands on the servo mechanism that controls the drive motor, which can be a problem in some cases.

While the embodiment described above has a stroke length of 1.5 cm, the invention can be implemented in larger stroke embodiments. In such cases, it is typically desirable to use a relatively longer rail and to configure the mirror and coil mountings so that they clear the ends of the rail.

In conclusion, it can be seen that the interferometer bearing assembly of the present invention is a surprisingly simple structure that provides a high degree of linearity in the mirror stroke. The design is versatile and readily lends itself to embodiments having short or long stroke.

While the above is a full description of the preferred embodiment, it will be appreciated that various modifications, alternative constructions, and equivalents may be used. For example, while the preferred embodiment uses a rail whose flat faces face away from each other, it is also possible to have the flat faces face each other to define a V-groove in which the carriage rides. Additionally, while the preferred embodiment has the glass rail fixed and the aluminum/plastic structure movable, the reverse configuration is also possible. Therefore, the above description and illustrations should not be taken as limiting the scope of the present invention as defined by the appended claims.

We claim:

1. In an interferometer wherein a reflector is reciprocated relative to a fixed structure, an interferometer bearing assembly for allowing a drive source to impart precise linear motion to the reflector, comprising:
    a first element having first and second non-parallel flat faces, said flat faces being characterized by a line of intersection; and
    a second element having means defining bearing surfaces configured to contact said flat faces;
    one of first and second elements being mounted to the fixed structure and the other of said first and second elements being adapted to carry the reflector and to couple to the drive source so as to provide relative motion along an axis parallel to said line of intersection.

2. In an interferometer wherein a movable reflector is reciprocated relative to a fixed structure, an interferometer bearing assembly for allowing a drive source to impart precise linear motion to the movable reflector, comprising:
    guide means defining first and second non-parallel flat faces, said flat faces being characterized by a line of intersection; and
    means for rigidly mounting said guide means to the fixed structure; and
    a carriage having means defining bearing surfaces configured to contact said flat faces, said carriage being adapted to carry the movable reflector and to couple to the drive source.

3. The interferometer bearing assembly of claim 2, and further comprising:
    means for biasing said carriage against said guide means, whereupon said carriage is constrained to move along an axis parallel to said line of intersection.

4. The interferometer bearing assembly of claim 3 wherein said means for biasing comprises:
    a spring-loaded first element mounted to said carriage; and
    a second element, mounted to the fixed structure, and having a flat surface facing said first element for engaging said first element.

5. The interferometer bearing assembly of claim 2 wherein said flat faces of said guide means face away from each other.

6. The interferometer bearing assembly of claim 2 wherein said flat faces of said guide means are oriented at 90° to one another.

7. The interferometer bearing assembly of claim 2 wherein said flat faces terminate proximate said line of intersection.

8. The interferometer bearing assembly of claim 2 wherein said guide means comprises an elongated glass body.

9. The interferometer bearing assembly of claim 2 wherein said means defining bearing surfaces comprise first and second pluralities of plastic bearing elements, each contacting a respective flat face of said rail.

10. In an interferometer wherein a movable reflector is reciprocated relative to a fixed structure, an interferometer bearing assembly for allowing a drive source to impart precise linear motion to the movable reflector, comprising:
- an elongate rail, formed of glass and having first and second non-parallel flat faces, said flat faces being characterized by a line of intersection;
- means for rigidly mounting said rail to the fixed structure;
- a carriage having means defining plastic bearing surfaces configured to contact said flat faces, said carriage being adapted to carry the movable reflector and to couple to the drive source; and
- means for biasing said carriage against said rail, whereupon said carriage is constrained to move along an axis parallel to said line of intersection.

11. The interferometer bearing assembly of claim 10 wherein said flat faces of said rail are oriented at 90° to one another.

12. The interferometer bearing assembly of claim 10 wherein said flat faces terminate proximate said line of intersection.

13. The interferometer bearing assembly of claim 10 wherein said means defining plastic bearing surfaces comprise first and second pluralities of plastic bearing elements, each contacting a respective flat face of said rail.

14. The inteferometer bearing assembly of claim 13 wherein said plastic bearing elements are formed of ultra-high molecular weight polyethylene.

15. The interferometer bearing assembly of claim 10 wherein said means for biasing comprises:
- a spring-loaded plastic element mounted to said carriage; and
- a glass element, mounted to the fixed structure, and having a flat surface facing said plastic element for engaging said plastic element.

16. In an interferometer wherein a movable reflector is reciprocated relative to a fixed structure, an interferometer bearing assembly for allowing a drive source to impart precise linear motion to the movable reflector, comprising:
- an elongate rail, formed of glass and having outwardly facing first and second non-parallel flat faces, said flat faces being characterized by and terminating near a line of intersection;
- means for rigidly mounting said rail to the fixed structure;
- a carriage having first and second pluralities of plastic bearing element, each plurality contacting a respective flat face of said rail, said carriage being adapted to carry the movable reflector and to couple to the drive source; and
- means for biasing said carriage against said rail, whereupon said carriage is constrained to move along an axis parallel to said line of intersection.

17. The interferometer bearing assembly of claim 16 wherein said flat faces of said rail are oriented at 90° to one another.

18. The interferometer bearing assembly of claim 16 wherein said means for biasing comprises:
- an upwardly biased spring-loaded plastic element mounted to said carriage; and
- a glass element, mounted to the fixed structure, and having a flat horizontal, downwardly-facing surface for engaging said plastic element.

* * * * *